(12) United States Patent
Mitchell et al.

(10) Patent No.: US 11,951,599 B2
(45) Date of Patent: *Apr. 9, 2024

(54) PIPE COUPON EXTRACTION TOOL

(71) Applicant: Mueller International, LLC, Atlanta, GA (US)

(72) Inventors: Timothy J. Mitchell, Hixson, TN (US); David Latimore Hughes, Jr., Signal Mountain, TN (US)

(73) Assignee: Mueller International, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/945,163

(22) Filed: Sep. 15, 2022

(65) Prior Publication Data

US 2023/0016444 A1 Jan. 19, 2023

Related U.S. Application Data

(62) Division of application No. 16/799,337, filed on Feb. 24, 2020, now Pat. No. 11,478,910.

(51) Int. Cl.
  *B25B 27/14* (2006.01)
  *F16L 55/00* (2006.01)
  *B25G 1/04* (2006.01)

(52) U.S. Cl.
  CPC .............. *B25B 27/14* (2013.01); *F16L 55/00* (2013.01); *B25G 1/04* (2013.01)

(58) Field of Classification Search
  CPC ......... Y10T 29/53943; Y10T 29/53952; Y10T 29/53987; Y10T 29/53909; Y10T 29/53913; Y10T 29/53917; F16L 55/00; F16L 55/18; F16L 41/04; B25B 33/00; B25G 3/26

USPC ........................................... 29/426.5; 81/488
  See application file for complete search history.

(56) References Cited

U.S. PATENT DOCUMENTS

| | | | |
|---|---|---|---|
| 438,740 A | 10/1890 | Eley | |
| 485,715 A | 11/1892 | Smith | |
| 1,045,289 A | 11/1912 | Hill | |
| 2,601,434 A | 6/1952 | Du Bois | |
| 2,800,812 A | 7/1957 | Mueller et al. | |
| 2,911,859 A * | 11/1959 | Longley | F16L 41/06 81/55 |
| 4,279,551 A | 7/1981 | Wilterding | |
| 5,964,240 A * | 10/1999 | Granovski | F16L 41/06 408/112 |
| 6,446,662 B1 * | 9/2002 | Wagner | F16L 41/16 138/97 |

(Continued)

OTHER PUBLICATIONS

Huffman, Jeffrey Allen; Applicant-Initiated Interview Summary for U.S. Appl. No. 16/421,537, filed May 24, 2019, dated Sep. 1, 2020, 3 pgs.

(Continued)

*Primary Examiner* — Brian D Keller
*Assistant Examiner* — Alberto Saenz
(74) *Attorney, Agent, or Firm* — Taylor English Duma LLP

(57) ABSTRACT

A pipe coupon extraction tool includes a rod defining a first end, a second end, and a central axis; and a spring bar defining a first end and a second end, the spring bar rotatably secured to the rod, a surface of the spring bar configured to be angled with respect to the central axis when the pipe coupon extraction tool is engaged with a pipe coupon.

20 Claims, 13 Drawing Sheets

(56) References Cited

U.S. PATENT DOCUMENTS

| | | | |
|---|---|---|---|
| 7,357,605 | B2 | 4/2008 | Weiler |
| 7,438,509 | B1 | 10/2008 | Wong et al. |
| 7,496,999 | B2 * | 3/2009 | Robarge ................ F16K 31/46 29/261 |
| 8,104,517 | B2 | 1/2012 | German |
| 2,648,563 | A1 | 9/2017 | Turner |
| 10,870,157 | B2 | 12/2020 | Huffman |
| 11,478,910 | B2 | 10/2022 | Mitchell et al. |
| 2006/0188349 | A1 | 8/2006 | Weiler |
| 2007/0297867 | A1 | 12/2007 | Weiler |
| 2017/0252910 | A1 * | 9/2017 | Turner ..................... F16L 1/06 |
| 2020/0368828 | A1 | 11/2020 | Huffman |
| 2021/0260739 | A1 | 8/2021 | Mitchell et al. |
| 2023/0150040 | A1 | 5/2023 | Hughes, Jr. |

OTHER PUBLICATIONS

Huffman, Jeffrey Allen; Non-Final Office Action for U.S. Appl. No. 16/421,537, filed May 24, 2019, dated Jul. 22, 2020, 15 pgs.
Huffman, Jeffrey Allen; Notice of Allowance for U.S. Appl. No. 16/421,537, filed May 24, 2019, dated Nov. 10, 2020, 5 pgs.
Mueller Co; Installation Instructions for Mueller Inserting Valves, revised Jun. 1972, 16 pgs.
Grainger; Article entitled: "Steel Toggle Bolt Anchor, #10-24 Anchor Thread Size x2-5/8" Usable Length, 50 pk, accessed on Jan. 16, 2020, 4 pgs.
Mitchell, Timothy J.; Applicant-Initiated Interview Summary for U.S. Appl. No. 16/799,337, filed Feb. 24, 2020, dated Jan. 5, 2022, 6 pgs.
Mitchell, Timothy J.; Final Office Action for U.S. Appl. No. 16/799,337, filed Feb. 24, 2020, dated Mar. 28, 2022, 25 pgs.
Mitchell, Timothy J.; Non-Final Office Action for U.S. Appl. No. 16/799,337, filed Feb. 24, 2020, dated Oct. 22, 2021, 31 pgs.
Mitchell, Timothy J.; Notice of Allowance for U.S. Appl. No. 16/799,337, filed Feb. 24, 2020, dated Jun. 16, 2022, 12 pgs.
Mitchell, Timothy J.; Requirement for Restriction/Election for U.S. Appl. No. 16/799,337, filed Feb. 24, 2020, dated Jul. 22, 2021, 7 pgs.
Mueller Co.; Data sheet for Mueller H-17619 Inspection Flange Replacement Parts, published Dec. 2006, 1 pg.
Koppl Pipeline Services; Article entitled: "Hot Tapping", available at <https://www.koppl.com/hot-tapping/>, accessed on Nov. 19, 2021, 3 pgs.
Mueller Co.; Article entitled: "CL-12 Drilling Machine", Copyright 2016, 20 pgs.
Pipeman Products, Inc.; Article entitled: "TapMaster Carbide Tipped Hot Tap Pilots with Dual Retention Wires", available at <https://pipemanproducts.com/products.php?cat=TapMaster-Carbide-Tipped-Hot-Tap-Pilots>, accessed on Nov. 19, 2021, 1 pg.
tollbin.com; Article entitled: "Coupon Retention Pilot Drills, Drill Shafts, Spaid Insert Tips and Pilot Drill Tips", available at <https://www.2bin.om/Pilot-Drill-Bits-ALL.shtml>, accessed on Nov. 19, 2021, 9 pgs.
Mueller Co; Catalog for Mueller Large Drilling Machines, publicly available prior to one year before May 24, 2019, 54 pages.
Mueller Co; Drawings of a pilot drill for a pipe cutting tool, publicly available prior to one year before May 24, 2019, 1 pg.
Koppl Pipeline Services; Article entitled: "Hot Tapping", retrieved from <https://web.archive.org/web/20171101095739/http://www.koppl.com/hot-tapping/>, available on the Wayback Machine as early as Nov. 1, 2017, 3 pgs.
Pipeman Products, Inc.; Article entitled: "TapMaster Carbide Tipped Hot Tap Pilots and Dual Retention Wires", retrieved from <https://web.archive.org/web/20180819164711/https://pipemanproducts.com/products.php?cat=TapMaster-Carbide-Tipped-Hot-Tap-Pilots>, available on the Wayback Machine as early as Aug. 19, 2018, 1 pg.
toolbin.com; Article entitled: "Pilot Drills, Drill Shafts, Spaid Insert Tips, Pilot Drill Tips", retrieved from <https://web.archive.org/web/20190212040836/https://www.2lbin.com/Pilot-Drill-Bits-ALL.shtml>, available on the Wayback Machine as early as Feb. 12, 2019, 6 pgs.
Hughes Jr., David Latimore; Requirement for Restriction/Election for U.S. Appl. No. 17/530,120, filed Nov. 18, 2021, dated Dec. 13, 2022, 5 pgs.
Hughes Jr., David Latimore; Requirement for Restriction/Election for U.S. Appl. No. 17/530,120, filed Nov. 18, 2021, dated Mar. 17, 2023, 7 pgs.
Hughes Jr., David Latimore; Notice of Allowance for U.S. Appl. No. 17/530,120, filed Nov. 18, 2021, dated Nov. 21, 2023, 5 pgs.
Hughes Jr., David Latimore; Non-Final Office Action for U.S. Appl. No. 17/530,120, filed Nov. 18, 2021, dated Aug. 16, 2023, 26 pgs.

* cited by examiner

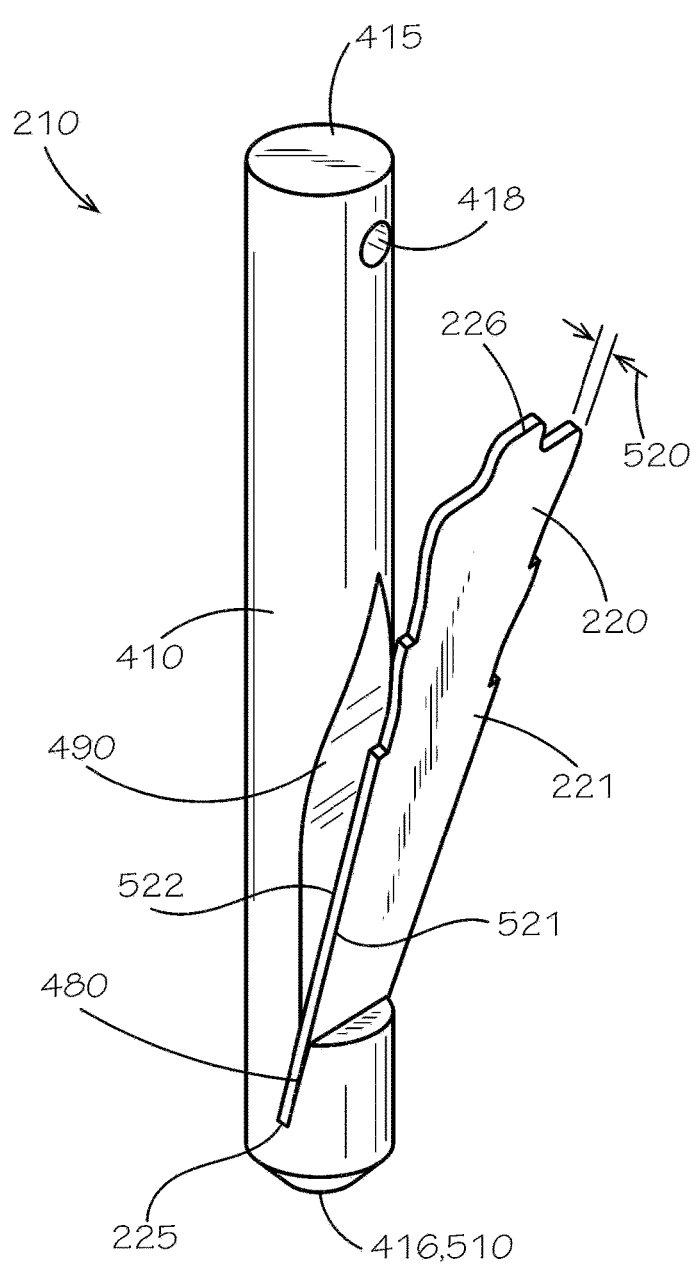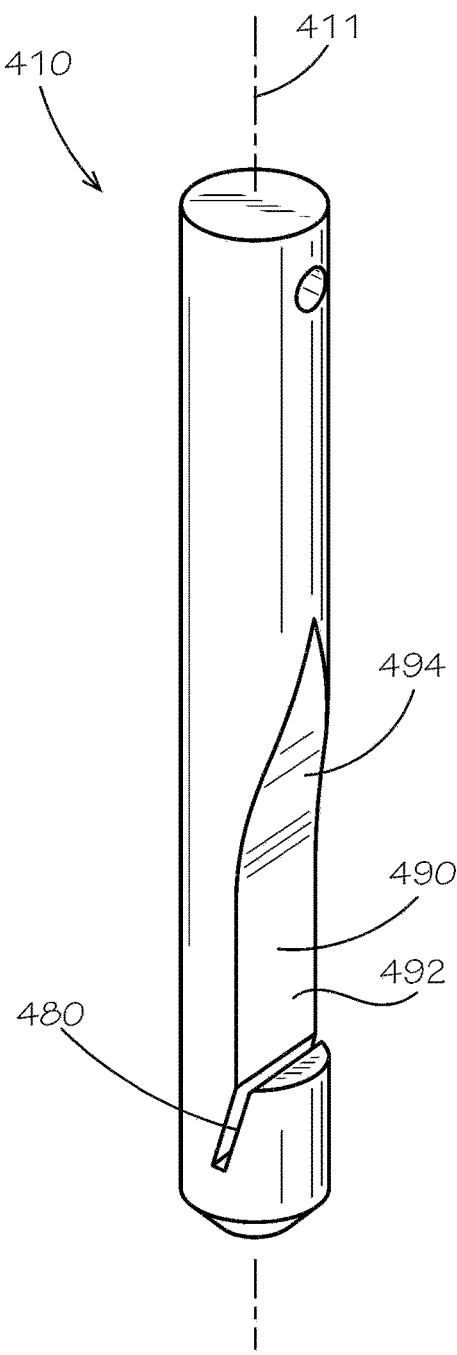
FIG. 5A  FIG. 5B

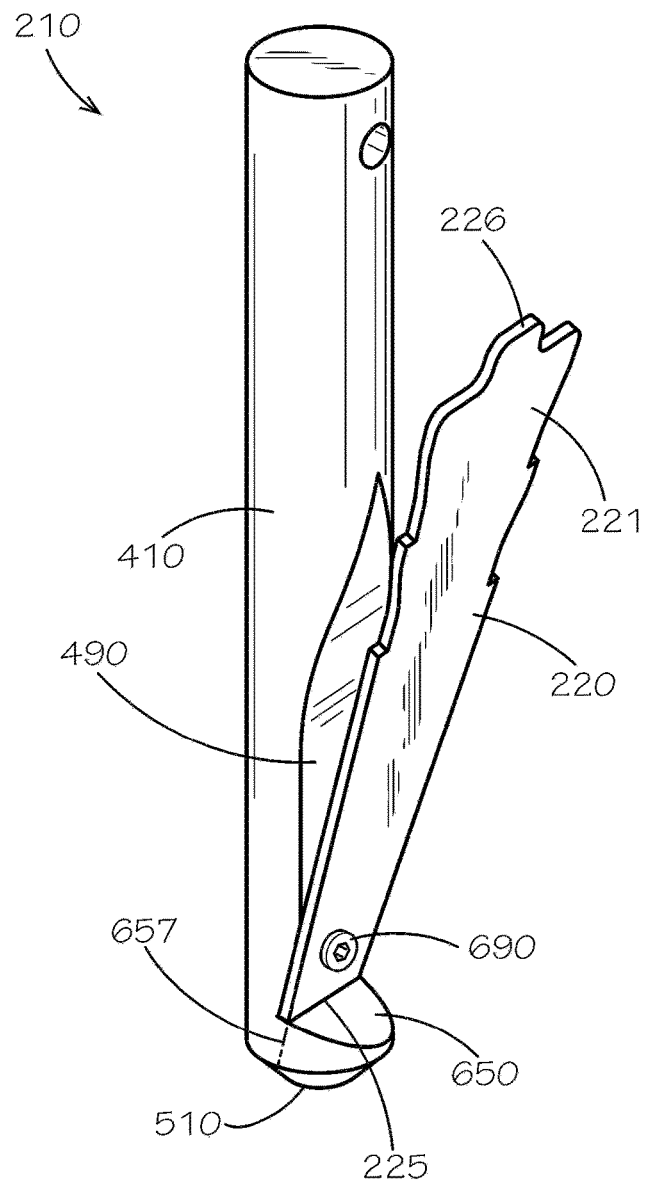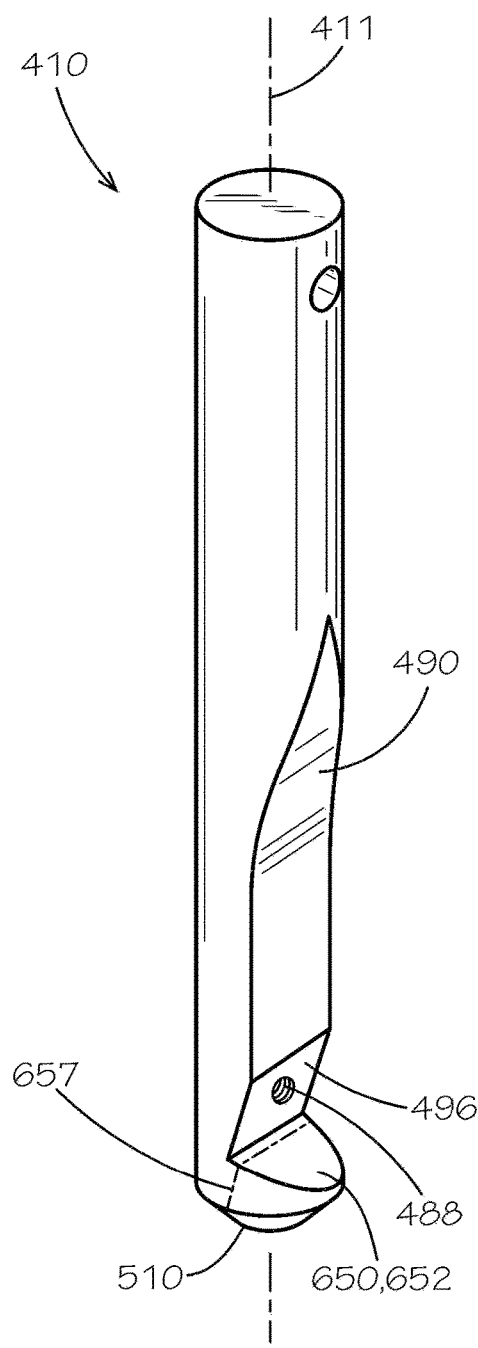
FIG. 6A  FIG. 6B

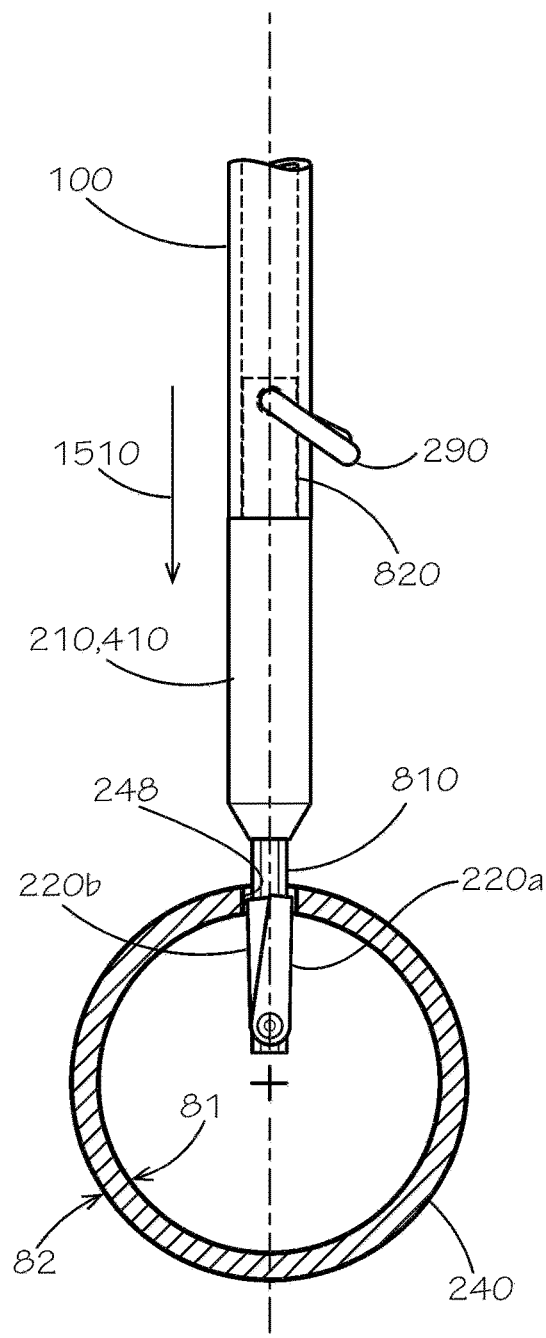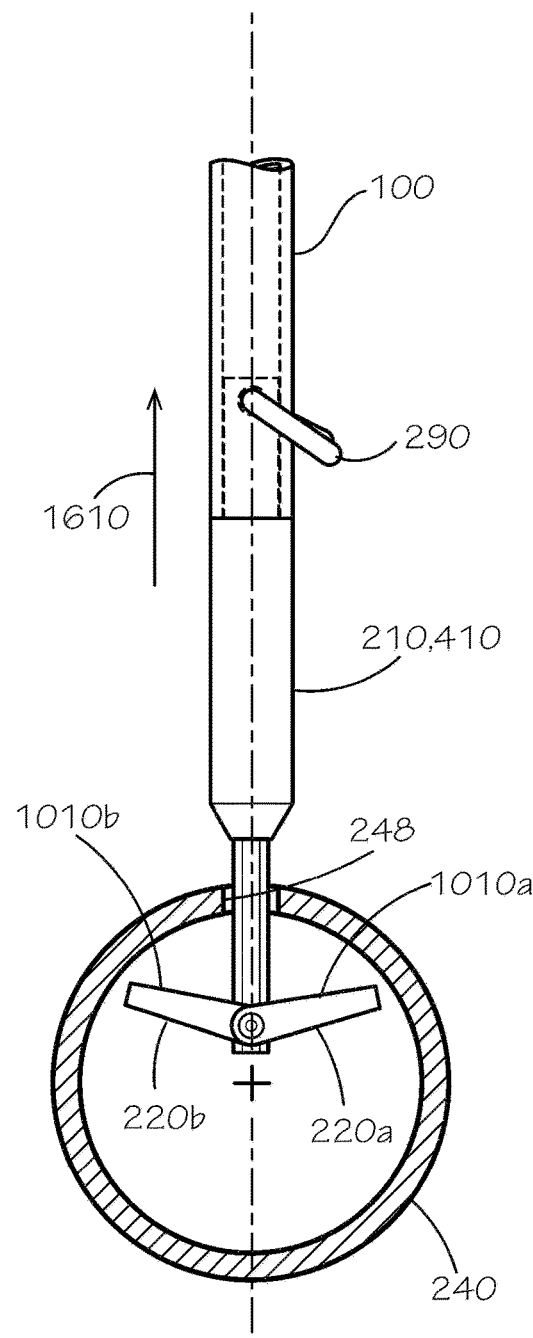
FIG. 15  FIG. 16

PIPE COUPON EXTRACTION TOOL

REFERENCE TO RELATED APPLICATIONS

This application is a divisional of U.S. application Ser. No. 16/799,337, filed Feb. 24, 2020, which is hereby specifically incorporated by reference herein in its entirety.

TECHNICAL FIELD

Field of Use

This disclosure relates to pipe coupon extraction tools. More specifically, this disclosure relates to pipe coupon extraction tools able to remove a pipe coupon from an insertion valve.

Related Art

A pipe coupon can be cut from an installed pipe, including a pipe buried in the ground or other structure that is part of a permanent fluid distribution system. When the pipe is pressurized, if can be important to not only cut the pipe coupon—a process often performed with a special tool resembling a large hole saw—but also remove the pipe coupon, all without allowing leakage of the fluid in the system from the pipe. While equipment such as an insertion valve assembly can facilitate this process, removal of the pipe coupon in all conditions can be difficult or impossible.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a pipe coupon extraction tool comprising: a rod defining a first end, a second end, and a central axis; and a spring bar defining a first end and a second end, the spring bar rotatably secured to the rod, a surface of the spring bar configured to be angled with respect to the central axis when the pipe coupon extraction tool is engaged with a pipe coupon.

In a further aspect, disclosed is a pipe coupon extraction tool comprising: a tool head comprising: a rod defining a first end, a second end, and a central axis; and a spring bar defining a first end and a second end, the spring bar rotatably secured to the rod, a surface of the spring bar angled with respect to the central axis when the pipe coupon extraction tool is engaged with a pipe coupon, the spring bar being configured not to flex between the first end and the second end; and a tool extension secured to the first end of the rod of the tool head, the tool extension defining a tool end and a handle end, the tool extension comprising a handle portion proximate to the handle end, the handle configured to be grasped by a hand of a user of the tool.

In yet another aspect, disclosed is a method of extracting a pipe coupon from a pipe, the method comprising: inserting a tool head of a pipe coupon extraction tool into a bore cut into the pipe coupon, the tool head defining a first end and a second end; inserting at least a portion of each of a rod and a spring bar of the tool head into the bore of the pipe coupon without the spring bar itself flexing; engaging a portion of the spring bar with an inner surface of the pipe coupon, the spring bar configured to stop against and not pass through the bore of the pipe coupon in an engaged position; and pulling the pipe coupon away from the pipe with the tool head.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

FIG. 5A is a perspective view of a tool head of the pipe coupon extraction tool of FIG. 1, the tool head comprising a rod and a spring bar.

FIG. 5B is a perspective view of the rod of FIG. 5A.

FIG. 6A is a perspective view of the tool head of FIG. 5A in accordance with another aspect of the current disclosure.

FIG. 6B is a perspective view of the rod of FIG. 5.

FIG. 15 is a sectional view of an assembly of the tool head of FIG. 8 during installation in the pipe coupon of FIG. 2.

FIG. 16 is a sectional view of an assembly of the tool head of FIG. 8 after installation in the pipe coupon of FIG. 2.

DETAILED DESCRIPTION

Figure 1:
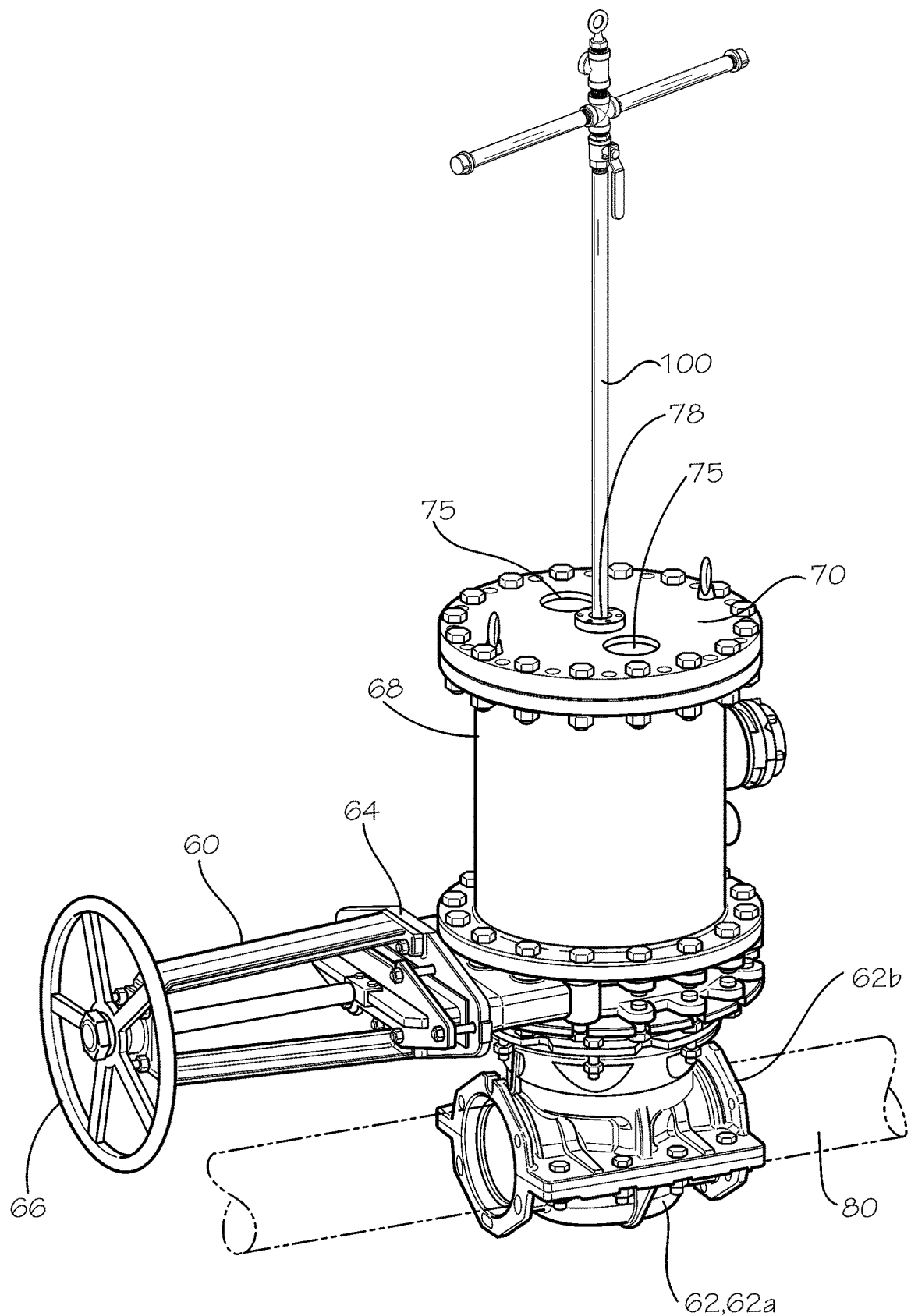
FIG. 1 is a top perspective view of an insertion valve assembly that is assembled about a pipe and in receipt of a pipe coupon extraction tool in accordance with one aspect of the current disclosure.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise. In addition, any of the elements described herein can be a first such element, a second such element, and so forth (e.g., a first widget and a second widget, even if only a "widget" is referenced).

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list. The phrase "at least one of A and B" as used herein means "only A, only B, or both A and B"; while the phrase "one of A and B" means "A or B."

To simplify the description of various elements disclosed herein, the conventions of "left," "right," "front," "rear," "top," "bottom," "upper," "lower," "inside," "outside," "inboard," "outboard," "horizontal," and/or "vertical" may be referenced. Unless stated otherwise, "front" describes that end of a tool head nearest to and facing a fastener of a spring bar of the tool head; "rear" is that end of the tool head that is opposite or distal the front; "left" is that which is to the left of or facing left from a person facing towards the front; and "right" is that which is to the right of or facing right from that same person facing towards the front. "Horizontal" or "horizontal orientation" describes that which is in a plane extending from left to right and aligned with the horizon. "Vertical" or "vertical orientation" describes that which is in a plane that is angled at 90 degrees to the horizontal.

In one aspect, a pipe coupon extraction device and associated methods, systems, devices, and various apparatuses are disclosed herein. In one aspect, the pipe coupon extraction device can comprise a rod and a spring bar coupled to the rod.

FIG. 1 is a top perspective view of an insertion valve assembly 60 assembled about a pipe 80 and in receipt of a pipe coupon extraction tool 100. In some aspects, as shown with the insertion valve assembly 60 in an inspection configuration, the insertion valve assembly 60 can comprise a valve sleeve 62 for installation or assembly about the pipe 80, a valve 64 with a valve actuator 66, a valve extension barrel 68, and an inspection plate 70. The insertion valve assembly 60 can also be at least a portion of an insertion valve system. In some aspects, the tool 100 can be part of an insertion valve chip evacuation (ICE) apparatus or "ICE" harpoon.

The valve sleeve 62 can comprise one or more pieces configured for installation or assembly about the pipe 80. As shown, the valve sleeve 62 can comprise two halves: a lower half 62a and an upper half 62b. The valve sleeve 62, among other functions, can seal against any leakage of a fluid from the pipe 80 into the environment proximate to where the insertion valve assembly 60 is positioned and can provide a mounting structure for the valve 64. The valve actuator 66 can actuate or operate the valve 64, which can be a knife gate valve. More specifically, the valve actuator 66 can cause a gate, ball, disc, or other sealing element of the valve 64 to travel between an open position and a closed position shown. In some aspects, as shown, the valve actuator 66 can be powered manually by a user through a mechanical drive such as a wheel in mechanical communication with the aforementioned sealing element. In some aspects, the valve actuator 66 can be powered by an electrical drive or any other drive able to operate the valve 64.

Other equipment (not shown), such as pipe fittings and drills used to cut a pipe coupon 240 (shown in FIG. 2) from the pipe 80, can be secured or mounted to the valve 64. Once removed, however, such equipment can be replaced by the valve extension barrel 68, which can define one or more inlets in fluid communication with other equipment for pressurizing or depressurizing the pipe 80 by transporting its contents therethrough. As shown, various components including those described herein can be secured to each other using a plurality of removable fasteners, each of which can be, for example and without limitation, a bolt and nut combination. The various components can be sealed to each other and to the pipe 80 using various seals or gaskets (not shown) to prevent any undesired leakage of a fluid from inside the pipe 80 to the environment or vice versa.

The inspection plate 70 can be secured or mounted to the valve extension barrel 68. The inspection plate 70 can, among other functions, close and seal a top end of the insertion valve assembly 60, receive a tool such as the pipe coupon extraction tool 100 through a bore 78 defined in the inspection plate 70, and provide visual inspection access through one or more windows 75. As shown, the inspection plate 70 can specifically define two windows 75, through which a portion of the tool 100 positioned inside the valve 60 can be viewed from multiple perspectives. For example, visibility of the portion of the tool 100 positioned inside the valve 60 can facilitate alignment and engagement of the pipe coupon extraction tool 100 with the pipe coupon 240.

The pipe coupon 240 can be cut from the pipe 80 using a tool resembling a large hole saw (not shown) but, in any case, will typically be then removed from the pipe 80 for further work on the pipe 80 and any system of which it may be part. Use of the insertion valve assembly 60 allows cutting and removal of the pipe coupon 240, even if the pipe 80 is pressurized, by surrounding and sealing around the pipe 80 with the sleeve 62 and other components and by selectively sealing off any pressurized contents of the pipe 80 with the valve 64. In aspects where the pipe coupon 240 has not already been removed from the pipe 80 after the pipe coupon 240 is cut, the pipe coupon extraction tool 100 can be used.

Figure 2:
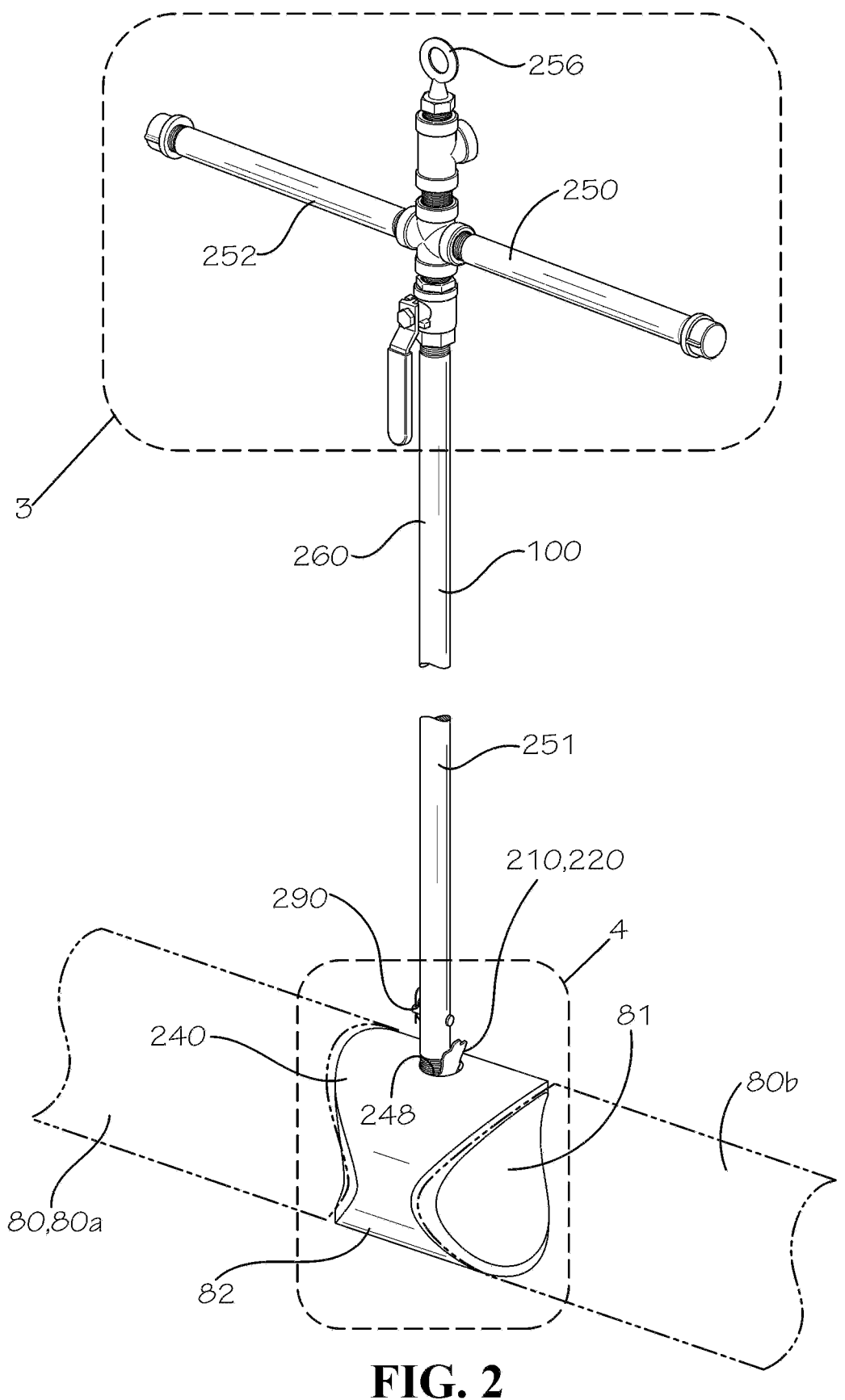
FIG. 2 is a top perspective view of the pipe coupon extraction tool of FIG. 1 and a pipe coupon after it has been cut from the pipe of FIG. 1.

FIG. 2 is a top perspective view of the pipe coupon extraction tool 100 and the pipe coupon 240 after the pipe coupon 240 has been cut from the pipe 80. In the process of cutting a full pipe coupon 240, pipe portions 80a and 80b can result. As shown, the pipe coupon extraction tool 100 can, more specifically, engage with the pipe coupon 240 such that the pipe coupon extraction tool 100 can manipulate a position of (i.e., move) the pipe coupon 240 or even the pipe 80 or the pipe portions 80a,b. In some aspects, the pipe coupon extraction tool 100 can be part of an even higher-level pipe coupon extraction system or assembly.

Figure 13:
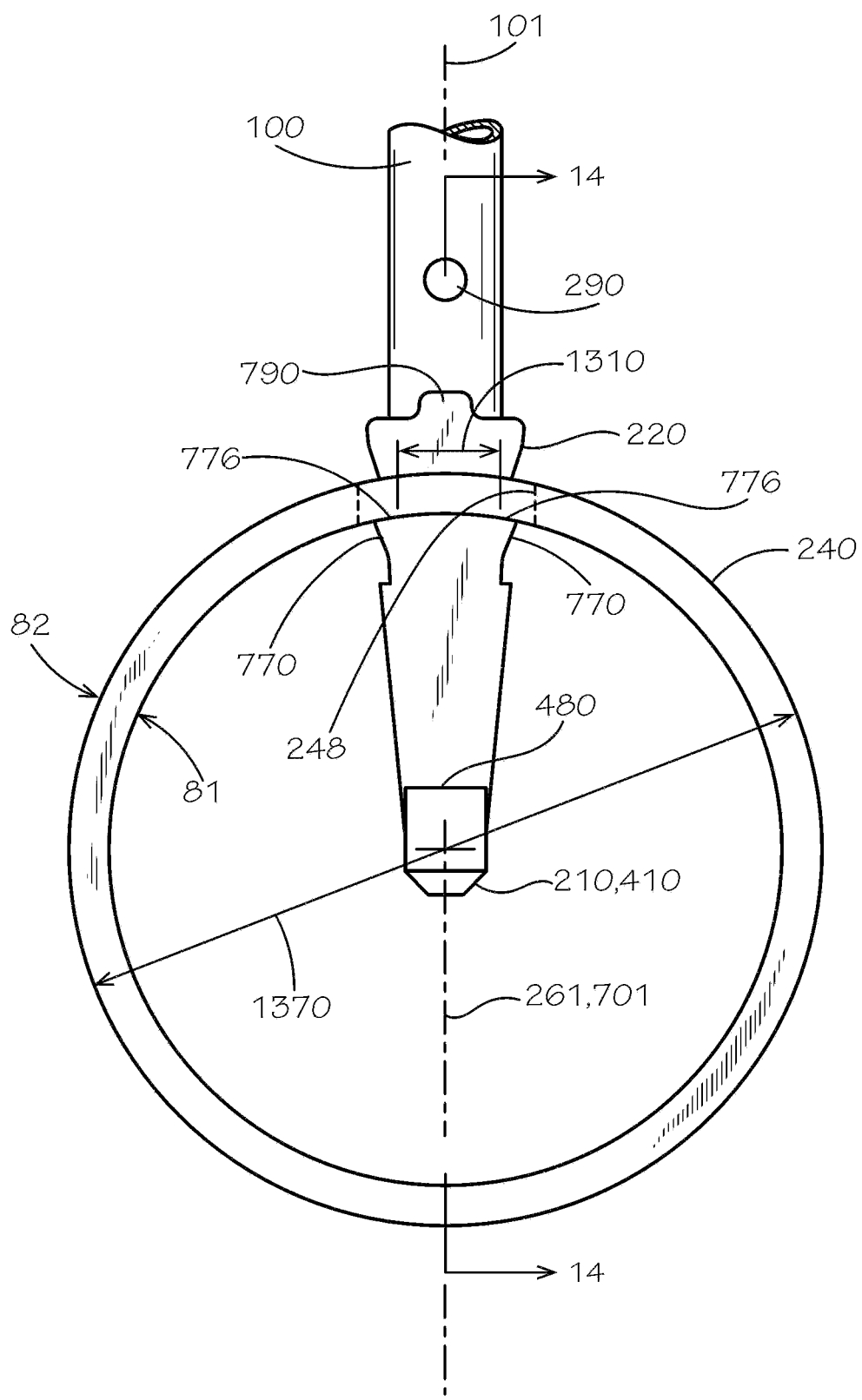
FIG. 13 is an end view of an assembly of the bottom end of the pipe coupon extraction tool of FIG. 2 installed in the pipe coupon of FIG. 2.
Figure 14:
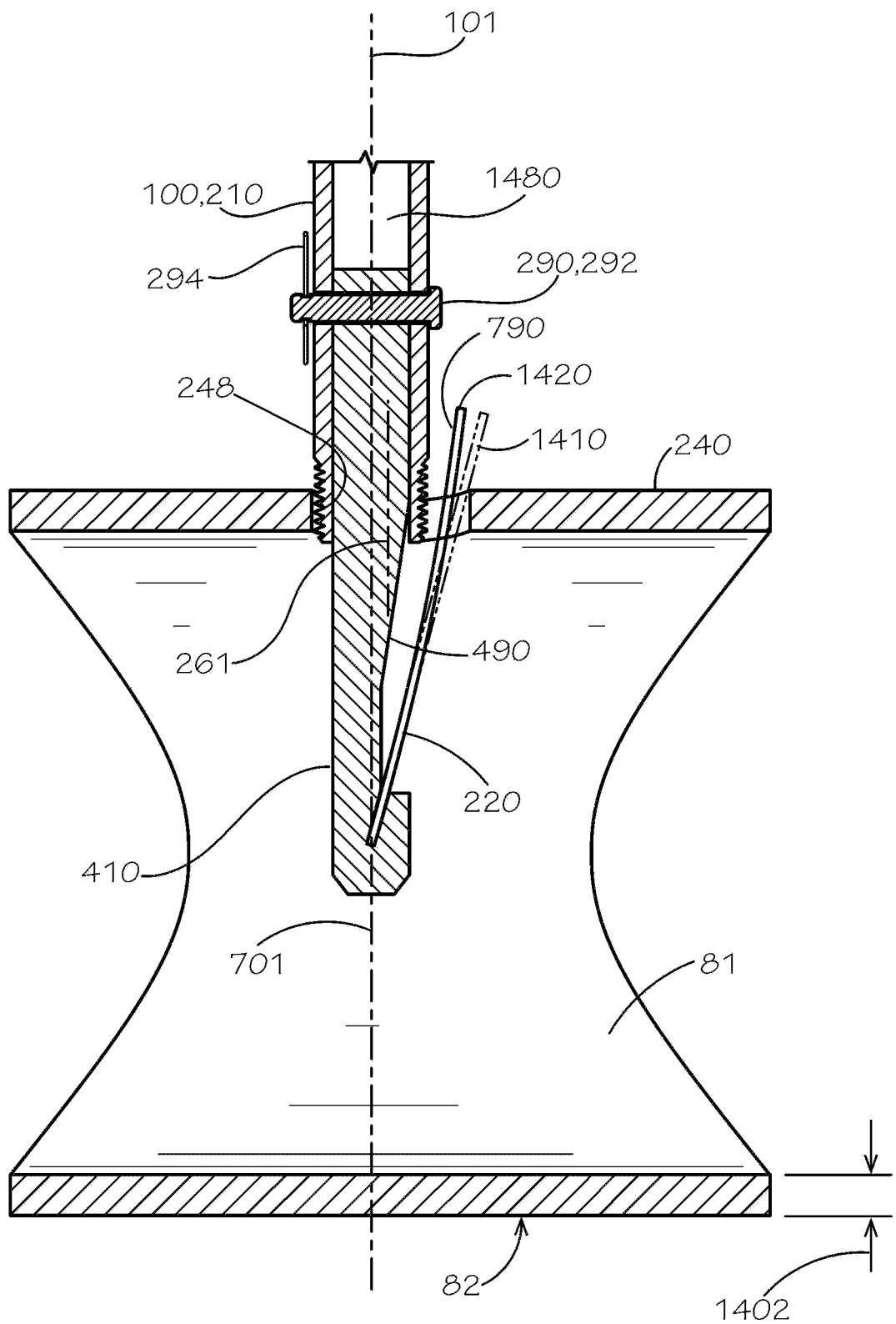
FIG. 14 is a sectional view of the assembly of FIG. 13 taken along line 14-14 of FIG. 13.

Being originally a section of the pipe 80, the pipe coupon 240 can define similar features as the pipe 80 including, for example and without limitation, an inner surface 81, an outer surface 82, a diameter 1370 (shown in FIG. 13), and a wall thickness 1402 (shown in FIG. 14). The pipe coupon 240 can further define a bore 248, which can receive the pipe coupon extraction tool 100 as shown. In some aspects, as shown, the pipe 80 and the pipe coupon 240 can be substantially circular in cross-section. In some aspects, the pipe 80 and the pipe coupon 240 can define a non-circular shape in cross-section.

The pipe coupon extraction tool 100 can comprise a tool head 210 and a tool extension 250. The tool head 210, as will be described in further detail below, can comprise a spring bar 220, which can be configured to engage the pipe coupon 240 or even the pipe 80 or the pipe portions 80a,b. The tool extension 250 can be removably coupled or secured to the tool head 210 with a fastener 290, which can be a removable fastener such as, for example and without limitation, a pin 292 (shown in FIG. 4) extending through the tool head 210 and the tool extension 250 and a cotter pin 294 (shown in FIG. 4) extending through the pin to secure the pin in position. More specifically, a central shaft or pole or main shaft 260 of the tool extension 250 can be secured to the tool head 210 and can extend any desired distance from the tool head 210. The main shaft 260 can define an extension portion 251 and a first end 255 (shown in FIG. 4) of the tool extension 250 and can extend more specifically to a handle portion 252 of the tool 100. The handle portion 252 can define a second end 256 of the tool 100. In some aspects, the main shaft 260 can be secured to the tool head 210 with the fastener 290 shown, and the main shaft 260 can be secured to the tool head 210 with threaded on one or both of the main shaft 260 and the tool head 210.

Figure 3:
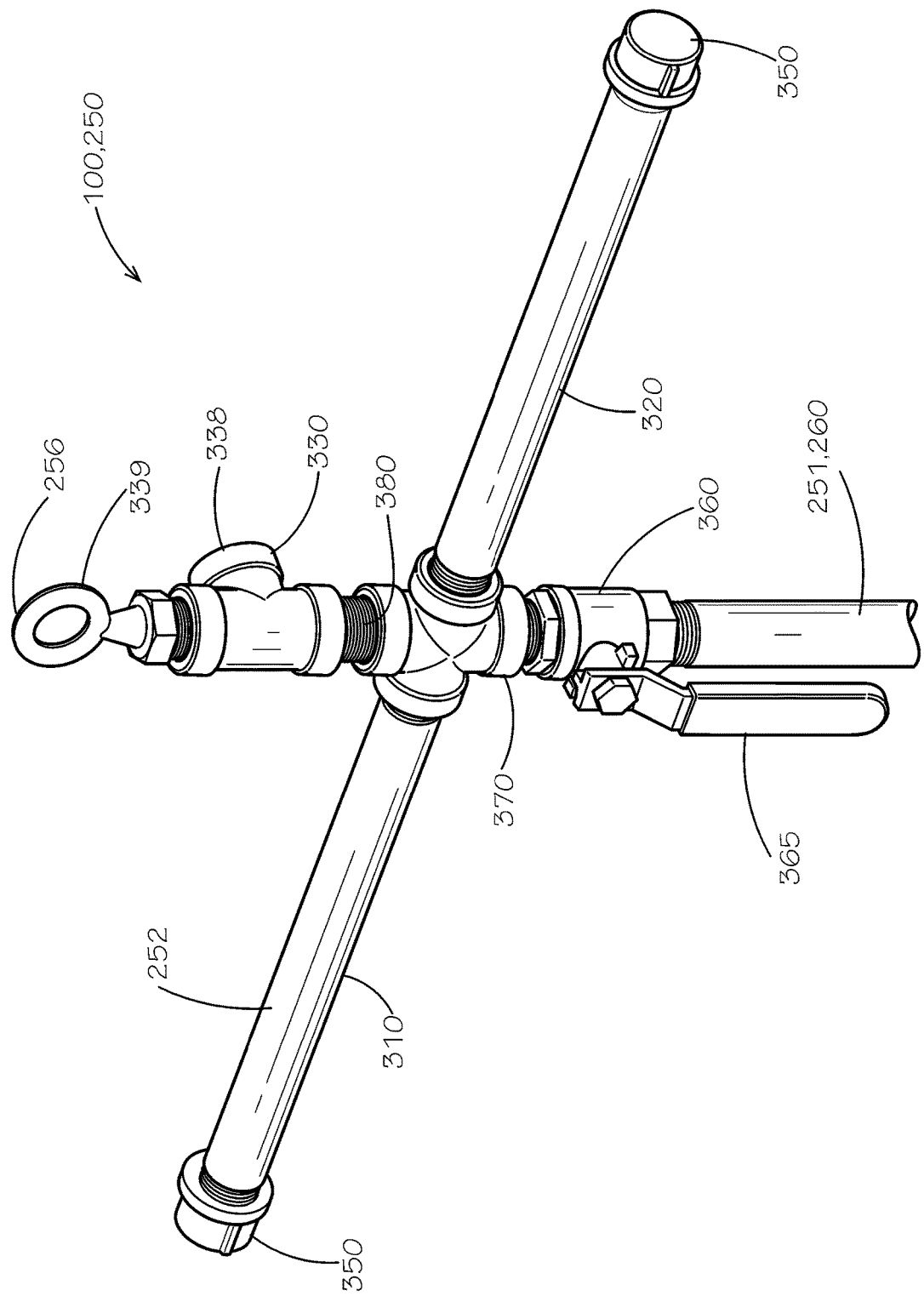
FIG. 3 is a detail perspective view of a top end of the pipe coupon extraction tool of FIG. 1 taken from detail 3 of FIG. 2.

FIG. 3 is a detail perspective view of a top end or the second end 256 of the pipe coupon extraction tool 100. The tool extension 250 of the tool 100 and specifically the handle portion 252 can comprise a first member or first grip 310 and a second member or second grip 320, each of which can be shaped and sized to fit one or both hands of a user of the tool 100. For example and without limitation, each of the grips 310,320 can be three to six inches long to accommodate a single hand of the user. The first grip 310 and the second grip 320 can extend in opposite directions away from and also angled with respect to the main shaft 260 of the tool extension 250. In some aspects, as shown, each of the first grip 310 and the second grip 320 can be angled with respect to the main shaft 260 by an angle of 90 degrees. In some aspects, either or both of the first grip 310 and the second grip 320 can be angled with respect to the main shaft 260 by any other angle. The tool extension 250 can comprise a third member or protrusion 330. The protrusion 330 can define an opening 338, which can be configured to transfer a fluid to or from an interior cavity 1480 (shown in FIG. 14) of the tool 100 and the pipe 80. The protrusion 330 can comprise an attachment fastener 339, which in some aspects as shown can be an eye fitting. One or more components of the tool 100 and specifically the tool extension 250 can be capped with a plug or cap 350 as shown, including to facilitate sealing of the interior cavity 1480. The attachment fastener 339 can also be replaced with another instance of the cap 340 in other aspects.

The tool extension 250 can comprise a tool extension valve 360, such as a ball valve or butterfly valve, comprising a valve handle 365, which can be selectively opened and closed to allow or prevent flow of the aforementioned fluid through the interior cavity 1480 of the tool extension 250 from the first end 255 (shown in FIG. 4) to the second end 256 or vice versa. In some aspects, the tool extension valve 360 can selectively place an interior cavity (not shown) of the tool head 210 (including structures not shown) in fluid communication with the opening 338 defined in the handle portion 252 of the tool extension 250, which can in some aspects be defined elsewhere in the tool extension 250. As shown, various fittings such as, for example and without limitation, a multi-outlet fitting 370 or a nipple 380 can attach various other components of the tool extension 250 or the tool 100.

Figure 4:
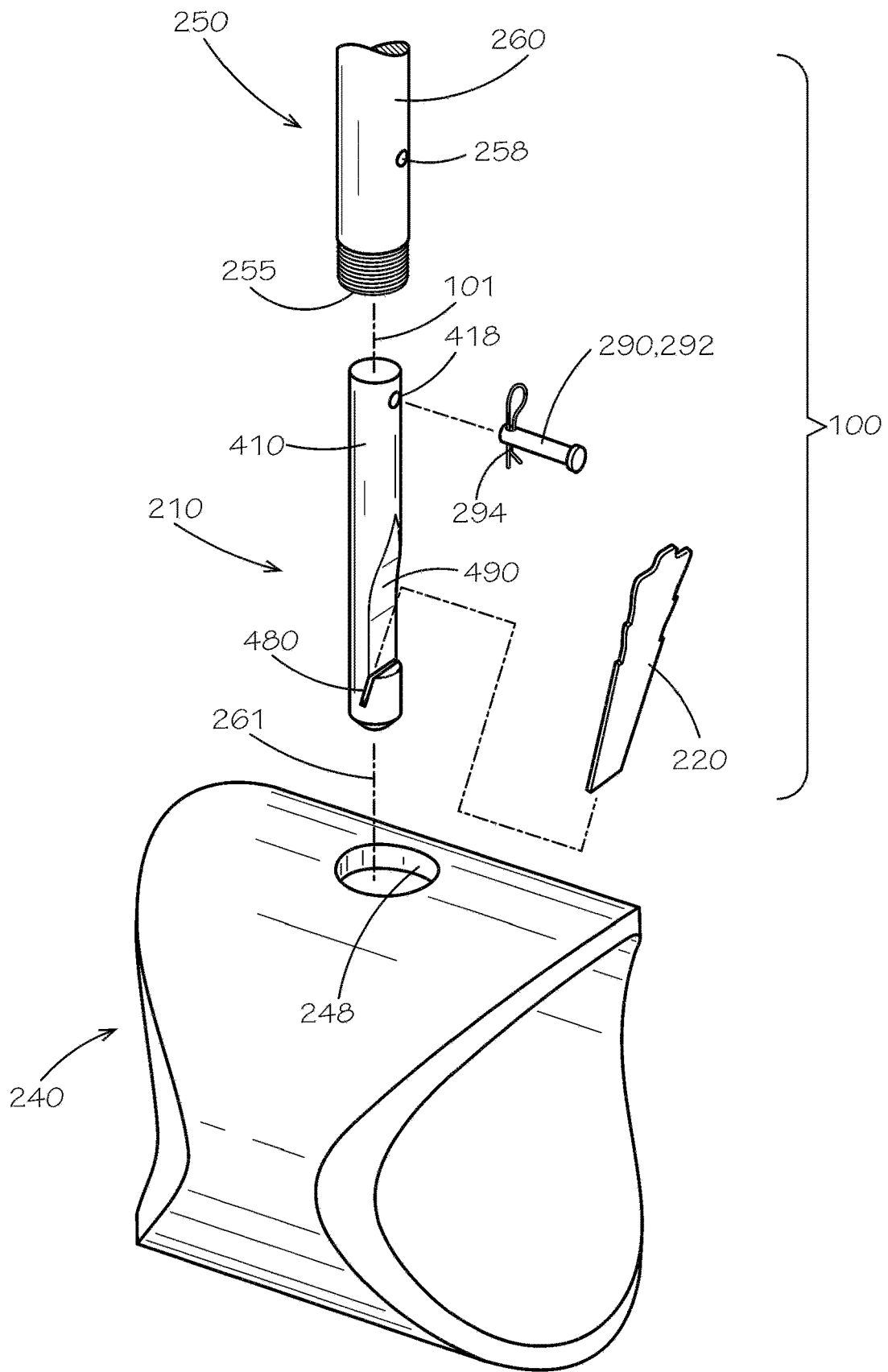
FIG. 4 is a detail perspective exploded view of a bottom end of the pipe coupon extraction tool of FIG. 1 and the pipe coupon of FIG. 2 taken from detail 4 of FIG. 2.

FIG. 4 is a detail perspective exploded view of a bottom end of the pipe coupon extraction tool 100 and the pipe coupon 240. A rod 410 of the tool head 210 be received within the first end 255 of the tool extension 250. The rod 410 can be secured through a connection bore 418 defined in the rod 410 and a connection bore 258 defined in the tool extension 250 using the fastener 290, which can comprise the aforementioned pin 292 and the cotter pin 294. The bore 248 of the pipe coupon 240 can be sized to receive the tool 100 and, more specifically, the tool head 210, including along a central axis 101 of the tool 100 and a bore axis 261 of the bore 248 of the pipe coupon 240. In some aspects, the main shaft 260 can be solid throughout or at least proximate to the first end 255. The tool head 210 can define a slot 480 sized and configured to receive and secure the spring bar 220. Insertion of the spring bar 220 into the slot 480 of the rod 410 can be along the path shown or can be in part from another side of the slot 480, at least where the slot 480 defines multiple side openings as shown. As will be further described, the tool head 210 can define a recess 490 to facilitate or allow insertion of and additional movement of the spring bar 220 with respect to the rod 410.

FIG. 5A is a perspective view of the tool head 210 of the pipe coupon extraction tool 100 (shown in FIG. 2) showing the spring bar 220 inserted into the slot 480 of the rod 410. A mounting end or first end 225 of the spring bar 220 can be captured or fixed in position inside the slot 480, and a distal end or second end 226 of the spring bar 220 can be free to move or rotate about or relative to the first end 225 during operation of the tool 100. The spring bar 220 can thus be rotatably secured to the rod 410 at a position proximate to a second end 416 of the rod 410. The connection bore 418 can be defined in or proximate to a mounting end or first end 415 of the rod 410, and a tip 510 of the rod 410 can be defined in or proximate to the second end 416 of the rod 410, which can be a distal end of the second end 416. The spring bar 220 can define an outer edge 521 in the plane of an outer surface 221 and can define an outer edge 522 in the plane of an inner surface 222 (shown in FIG. 7). Due to a thickness 520 of the spring bar 220 or other characteristic of the spring bar 220 allowing bending of the spring bar 220 about a longitudinal axis 701 (shown in FIG. 7), the spring bar 220 can be flexible. The spring bar 220 can in this sense also be a leaf spring. In some instances, the thickness 520 can be sufficiently great so as to not buckle during extraction of the pipe coupon 240.

FIG. 5B is a perspective view of the rod 410 of the tool head 210 (shown in FIG. 5). As shown, the slot 480 can be angled with respect to a central axis or axis 411 of the rod 410 and the central axis 101 (shown in FIG. 4) of the tool 100. The recess 490 can define surfaces such as surfaces 492,494, which can face the spring bar 220 once in position. In some aspects, each of the surfaces 492,494 can be parallel to the axis 411. In some aspects, each of the surfaces 492,494 can be angled with respect to the axis 411. As shown, the surface 492 proximate to the slot 480 can more specifically be parallel to the axis 411, and the surface 494 distal from the slot 480 can more specifically be angled with respect to the axis 411. In some aspects, as shown, the surface 492,494 can define flat or planar sections. In some aspects, the recess 490 can define curved or radiused sections. For example, as shown, the surface 494 can be curved.

FIG. 6A is a perspective view of the tool head 210 of the pipe coupon extraction tool 100 (shown in FIG. 2) showing the spring bar 220 otherwise secured to the rod 410 but without the slot 480 (shown in FIG. 5A). The first end 225 of the spring bar 220 can be captured or fixed in position against a surface 496 (shown in FIG. 6B) of the rod 410, and the second end 226 of the spring bar 220 can remain free to move or rotate as described above with respect to the tool head 210 shown in FIG. 5A. More specifically, the first end 225 of the spring bar 220 can define a bore (not shown), and the rod 410 can define a bore 488 (shown in FIG. 6B), and a fastener 690 can be assembled therethrough to fix the spring bar 220 to the rod 410. Even where the spring bar 220 is inserted into the slot 480 (shown in FIG. 5A), a fastener 690 can be used to secure the spring bar 220—assembled through the bore 488 even though not shown in FIG. 5A—and prevent any movement of the spring bar 220 with respect to the rod 410. In some aspects, a friction fit between the spring bar 220 and the rod 410 at the slot 480 can be used.

FIG. 6B is a perspective view of the rod 410 of the tool head 210 (shown in FIG. 5). As shown, the surface 496 can be angled with respect to an axis 411 of the rod 410 and the central axis 101 (shown in FIG. 4) of the tool 100. In some aspects, the first end 225 (shown in FIG. 6A) of the spring bar 220 (shown in FIG. 6A) can be shielded or recessed completed behind the tip 510, which can be shaped as shown or in any other desired shape to facilitate entry of the tool head 210 into the bore 248 of the pipe coupon 240. In some aspects, the spring bar 220 can be only partially shielded or recessed by removing a portion 650 of the tip 510, which in some aspects can be understood as that portion of the rod 410 defining a portion boundary 657, which can extend through the rod 410 as shown in FIG. 6B and define a planar surface. In some aspects, such as when the portion 650 is removed, the outer surface 221 (shown in FIG. 6A) of the spring bar 220 (shown in FIG. 6A) can be flush with an outer surface of the rod 410 proximate to the first end 225 of the spring bar 220. In some aspects, the outer surface 221 of the spring bar 220 can be recessed behind or protrude beyond the outer surface—and also the portion boundary 657—of the rod 410. The portion 650 can define a surface 652, which itself can in some aspects, as shown, be angled with respect to the axis 411. In some aspects, the surface 652 can be parallel to the axis 411.

Figure 7:
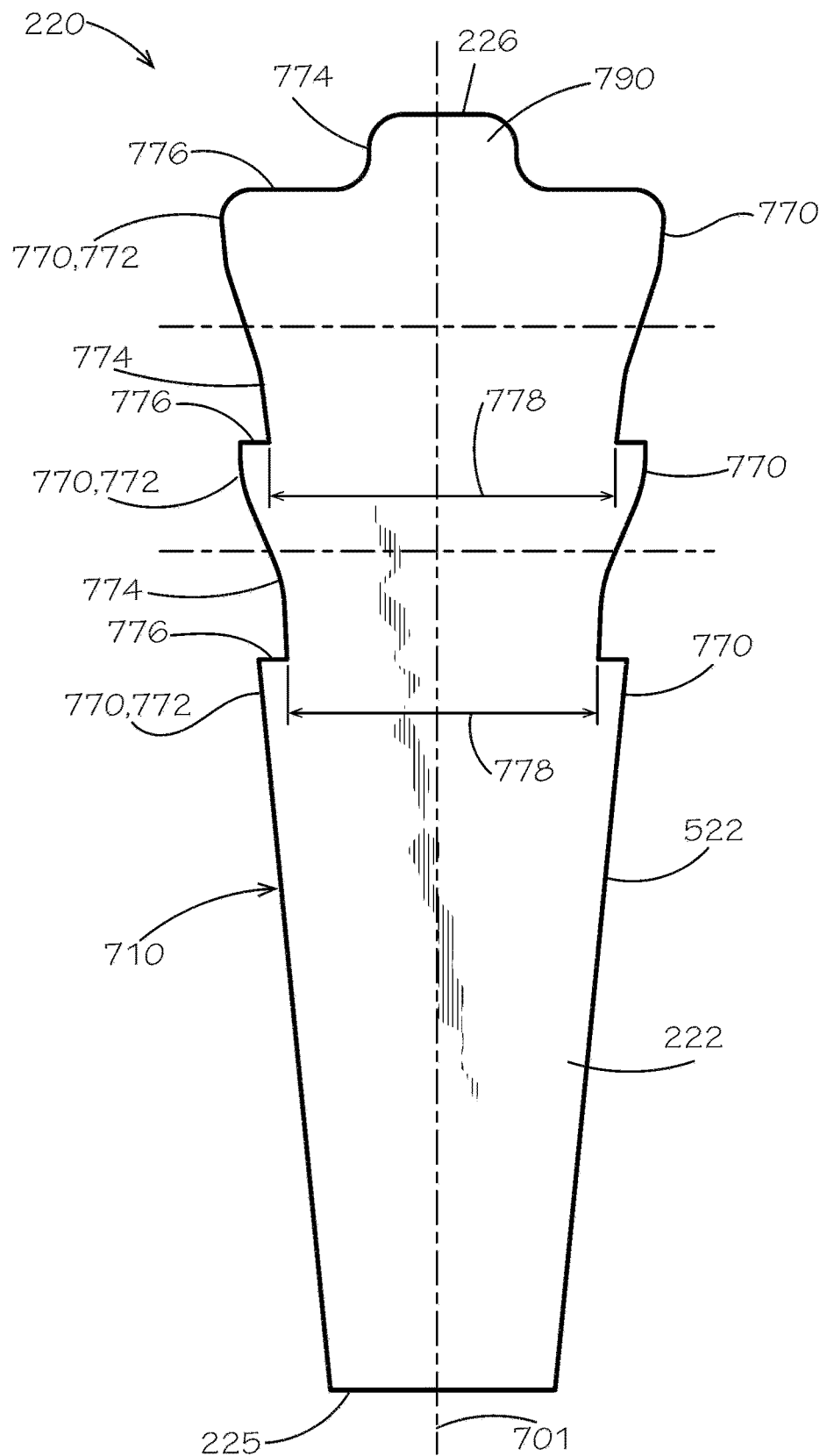
FIG. 7 is a plan view of the spring bar of FIG. 5A.

FIG. 7 is a plan view of the spring bar 220. The spring bar 220 can define the outer surface 221 (shown in FIG. 6A) and an inner surface 222 positioned distal from and facing opposite from the outer surface 221. The spring bar 220 can define the longitudinal axis 701 and, again, the outer edge 521 (shown in FIG. 5A) in the plane of the outer surface 221 (shown in FIG. 5A) and the outer edge 522 in the plane of the inner surface 222. The spring bar 220 can define an outer edge surface 710, which can extend from the outer surface 221 to the inner surface 222. In some aspects, as shown, the outer edge surface 710 can be perpendicular to each of the outer surface 221 and the inner surface 222. In some aspects, the outer edge surface 710 can be angled differently with respect to one or both of the outer surface 221 and the inner surface 222. The spring bar can be symmetrical about the longitudinal axis 701 such that geometry on one side is a mirror image of geometry on an opposite side with respect to the longitudinal axis 701.

The spring bar 220 can define one or more serrations 770 between the first end 225 of the spring bar 220 and the second end 226 of the spring bar 220. Each serration 770 can comprise or define a protruding edge 772, a recessed edge 774, and a stop edge 776 extending between the protruding edge 772 and the recessed edge 774. Each of the protruding edge 772, the recessed edge 774, and the stop edge 776 can correspond to and be accompanied by a protruding portion, a recessed portion, and a stop portion of the outer edge surface 710. Either or both of the protruding edge 772 (or the corresponding protruding surface) or the recessed edge 774 (or the corresponding recessed surface) can define a straight portion, a curved portion, or both straight and curved portions. In some aspects, the spring bar 220 can define of the one or more serrations 770 between the first end 225 of the spring bar 220 and the second end 226 of the spring bar 220. The spring bar 220 can comprise a tab 790, which can be proximate to the second end 226, can extend beyond any other portion of the spring bar 220 with respect to the first end 225, and can define the second end 226.

The stop edges 776 of the serration 770 can be made of such a length that the serration 770 will pass through the bore 248. The stop edges 776 of the serration 770 can also be made of such a length that the serration 770 will engage with and not pull free under load from a portion of the inner surface 81 of the pipe coupon proximate or adjacent to the bore 248.

Any or all of the outer edge 521, the inner edge 522, and the outer edge surface 710 can define a taper in which an overall width of the spring bar 220 measured in a direction perpendicular to the longitudinal axis 701 can narrow from the second end 226 to the first end 225. By incorporation of the taper, a width 778 of serrations 770 offset by a greater distance from the first end 225 of the spring bar 220a,b can be greater than the width 778 of serrations 770 offset by a lesser distance from the first end 225 of the spring bar 220a,b. Where the width 778 varies, the tool 100 can accommodate varying diameters of the bore 248 of the pipe coupon 240, which can correspond in some aspects to varying diameters 1370 of the pipe coupon 240. The width 778 of the largest or widest serration 770 can optionally be greater than the largest bore 248 that the user of the tool 100 would expect to encounter in order for a single tool 100 to accommodate the maximum size of the pipe coupon 240 or at least the pipe coupon 240 having the largest bore 248. Similarly, the width 778 of the smallest or narrowest serration 770 can optionally be less than the smallest bore 248 that the user of the tool 100 would expect to encounter in order for a single tool 100 to accommodate the minimum size of the pipe coupon 240 or at least the pipe coupon 240 having the smallest bore 248. A single tool 100 can in some aspects accommodate all possible sizes of the pipe coupon 240.

In some aspects, as will be described with respect to subsequent figures but applicable also to aspects described above, the spring bar 220 can be rigid and configured to not bend or flex and, instead of the spring bar 220 itself flexing, some other connecting structure can flex. A biasing element such as, for example and without limitation, a spring (not shown) and more specifically a spring such as, for example and without limitation, a compression spring, a leaf spring, or a torsion spring can be positioned between the spring bar 220 and the rod 410; or the tool head 210 can otherwise incorporate such a feature and compression of the spring can permit biased movement of the spring bar 220. In some aspects, a rigid spring bar 220 can be fixed to the rod 410 and the rod 410 can function as and be a fixed stationary barb to extract the pipe coupon 240. More specifically, engagement of the tool head 210 can result from moving the spring bar 220 towards one side of the bore 248, and disengagement of the tool head 210 can result from moving the spring bar 220 away from that one side of the bore 248.

Figure 8:
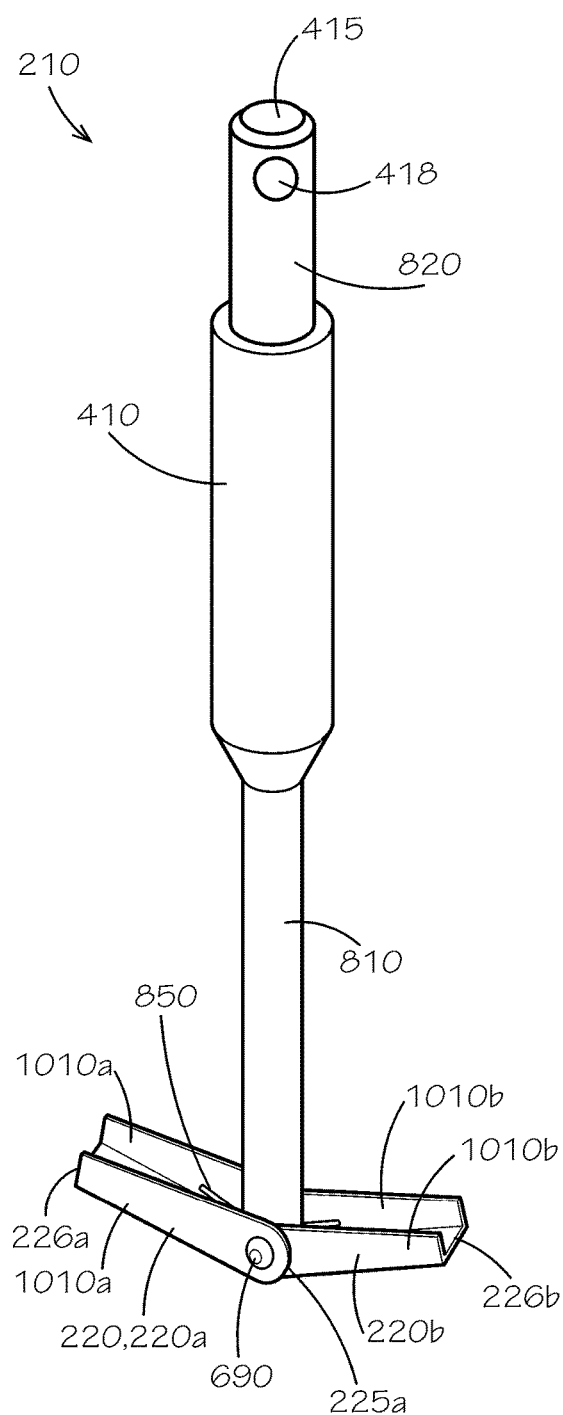
FIG. 8 is a perspective view of a tool head of the pipe coupon extraction tool of FIG. 1 in accordance with another aspect of the current disclosure.
Figure 9:
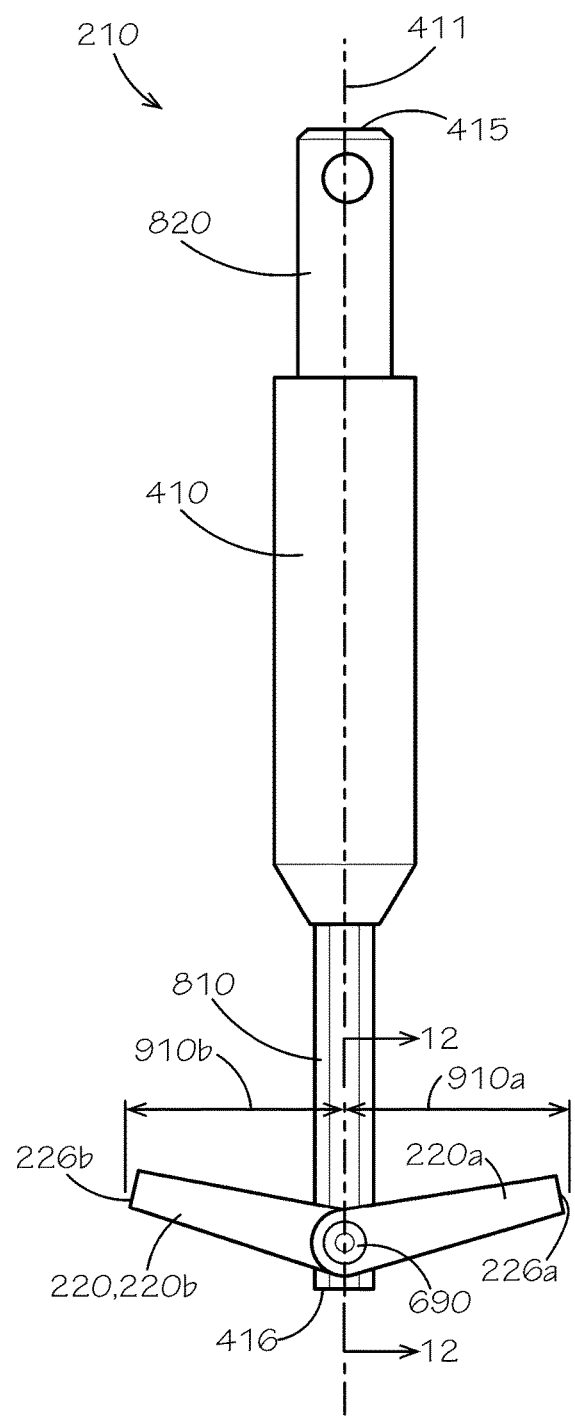
FIG. 9 is a front view of the tool head of FIG. 8.

FIGS. 8-12 show the pipe coupon extraction tool 100 in accordance with another aspect of the current disclosure. FIG. 8 is a perspective view and FIG. 9 is a front view of the tool head 210 of the pipe coupon extraction tool 100 in such an aspect. The spring bar 220 can comprise spring bars 220a,b, which can be secured to the rod 410 with and pivot about the fastener 690. Each of the first spring bar 220a and the second spring bar 220b can be rotatably secured to the rod 410 at a position proximate to the second end 416 of the rod 410. The fastener 690 can be angled with respect to the axis 411 of the rod 410.

A biasing element 850 such as the aforementioned biasing element can bias the spring bar 220 and the spring bars 220a,b towards an open position shown. As shown, the biasing element 850 can be a torsion spring. The rod 410 can comprise a first narrow portion 810, which can be at least as long or longer than a length of each of the spring bars 220a,b to receive the spring bars 220a,b in a closed position as shown in FIG. 15. As shown, in the open position, the spring bars 220a,b can be angled with respect to the axis 411 and towards the first end 415. The rod 410 can comprise a second narrow portion 820, which can be sized to be received within the main shaft 260 of the tool extension 250 (shown in FIG. 4). Each of the spring bars 220a,b can be tapered from first ends 225a,b towards respective second ends 226a,b.

Figure 10:
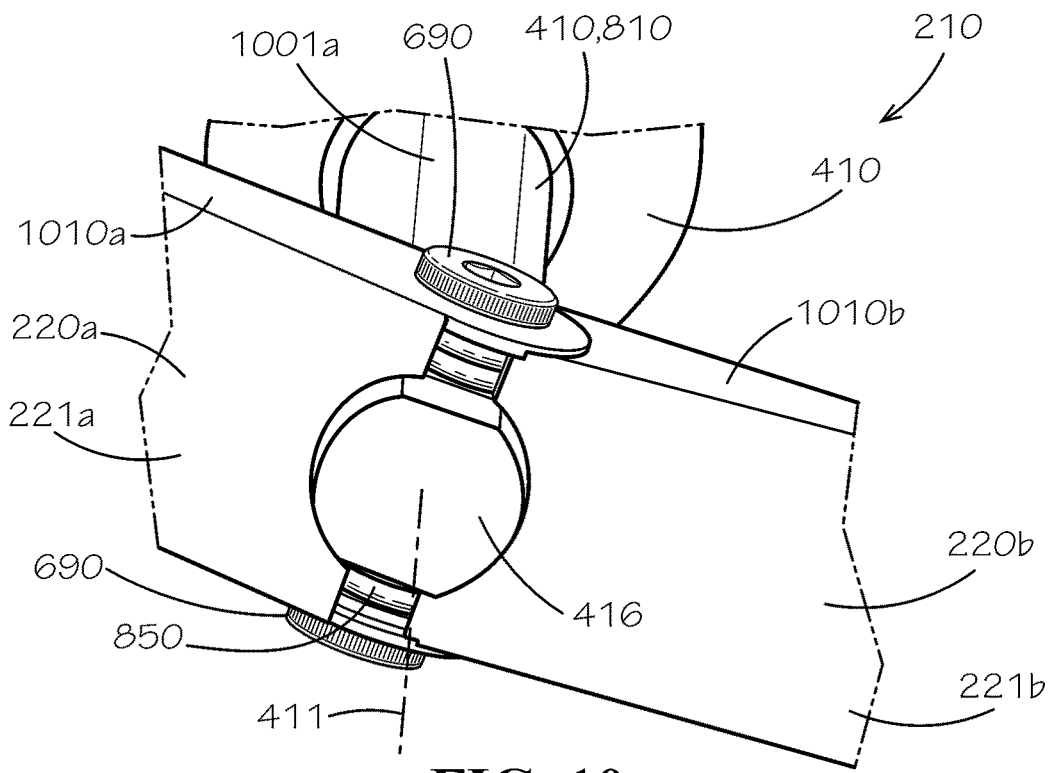
FIG. 10 is a detail bottom perspective view of the tool head of FIG. 8.
Figure 11:
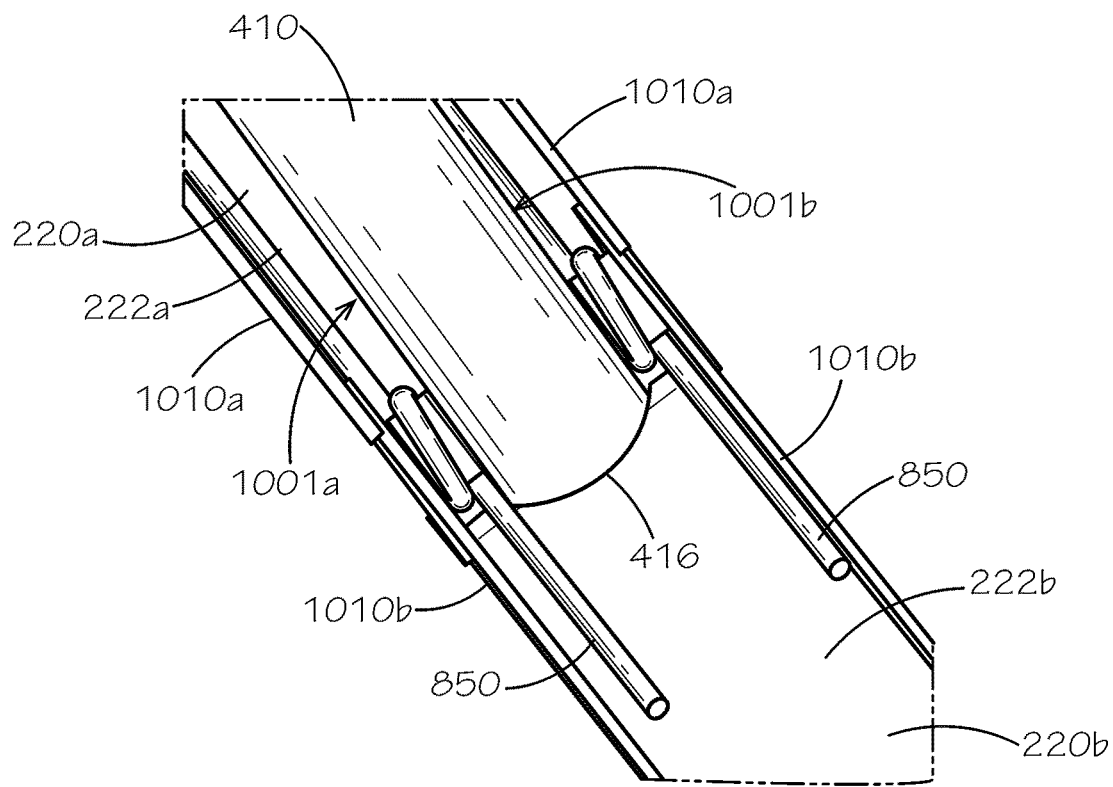
FIG. 11 is a detail top perspective view of the tool head of FIG. 8.
Figure 12:
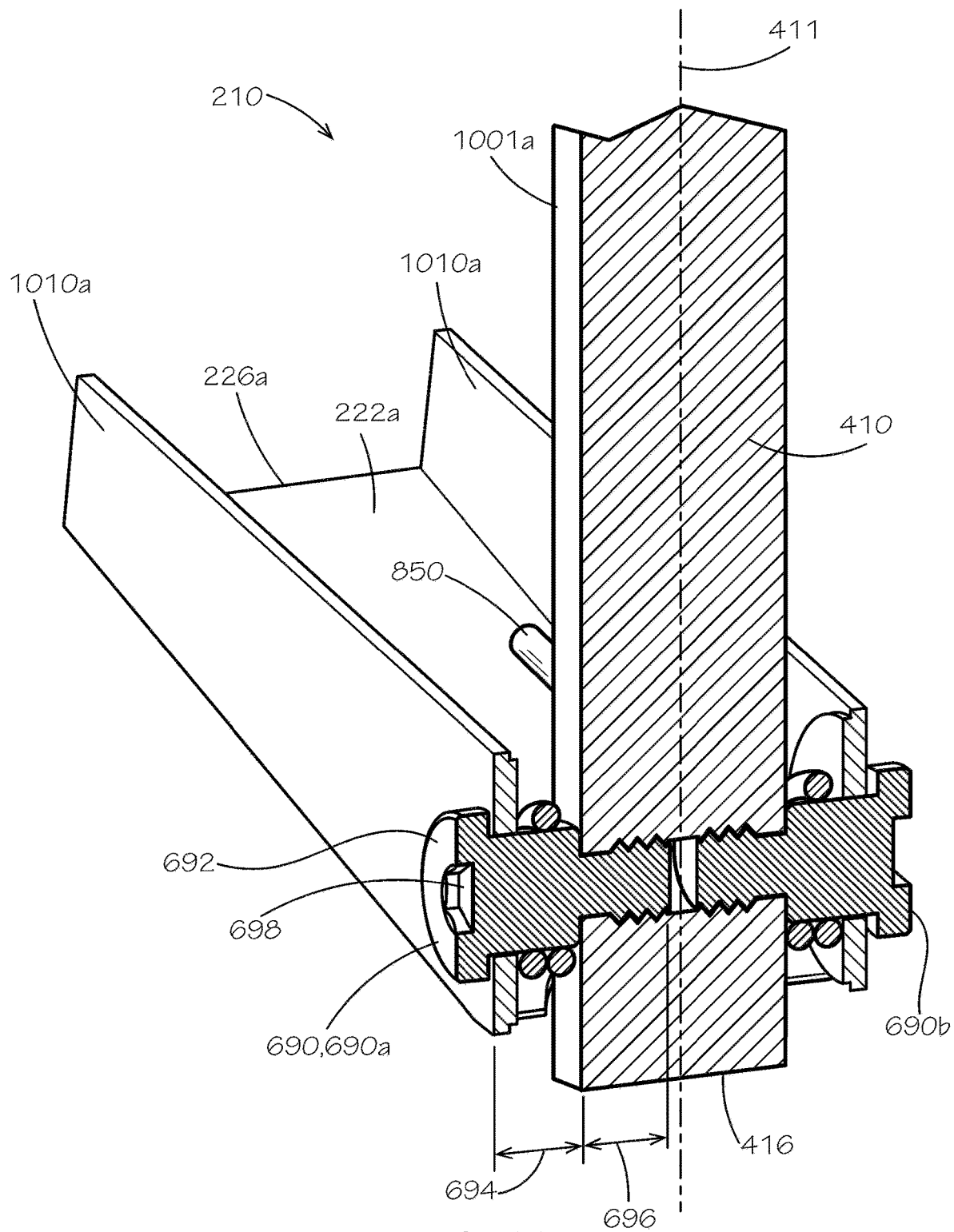
FIG. 12 is a detail sectional perspective view of the tool head of FIG. 8 taken along line 12-12 of FIG. 9.

FIG. 10 is a detail bottom perspective view, FIG. 11 is a detail top perspective view, and FIG. 12 is a detail sectional perspective view of the tool head 210. The rod 410 can define a flat surface 1001a,b on any portion thereof including the first narrow portion 810. As shown, each of the spring bars 220a,b can comprise a flange or flanges 1010a,b. The spring bars 220a,b can comprise respective outer surfaces 221a,b and respective inner surfaces 222a,b (shown in FIG. 11). As shown in FIG. 12, the fastener 690 can comprise fasteners 690a,b, which can separately secure opposite ends or sides of the spring bars 220a,b. As shown, the fasteners 690a,b can define a head 692, a shoulder 694, and a tail 696, which can be threaded. The head 692 can define a recess 698, which can facilitate rotation and tightening of the fastener 690a,b with, for example and without limitation, an Allen wrench.

As shown in FIGS. 11 and 12, the biasing elements 850 can be in contact with the corresponding spring bar 220a,b and can be configured to maintain a position of the spring bars 220a,b. The position of the spring bars 220a,b can maximize a radius 910a,b (shown in FIG. 9) or corresponding diameter—determining by combining the radii 910a,b—of the respective second ends 226a,b of the spring bars 220a,b relative to the axis 411 of the rod 410. When the radii 910a,b and any corresponding diameter—in the case of two spring bars 220a,b—is greater than a diameter or width of the bore 248 of the pipe coupon 240, a user of the tool 100 can be confident that the spring bars 220a,b will remain inside the pipe coupon 240 and not exit the bore 248 during extraction of the pipe coupon 240 from the pipe 80. As shown, a first end of the biasing element 850 as well as a second end thereof can contact the inner surface 222a,b of the respective spring bar 220a. As shown, turns of the biasing elements 850 can wrap around or encircle and be fixed in position by and relative to the fasteners 690a,b.

FIG. 13 is an end view and FIG. 14 is a sectional view of an assembly of the tool head 210 of FIGS. 2-7 together with the bottom end of the pipe coupon extraction tool 100 installed in the pipe coupon 240. The central axis 101 and the longitudinal axis 701 are shown optionally aligned along the bore axis 261, and with sufficient play between the tool head 210 and the bore 248 both intended or unintended misalignment can be acceptable. As shown, the serrations 770 and specifically the stop edges 776 can contact with the inner surface 81 of the pipe coupon 240 and thereby facilitate extraction of the pipe coupon 240 by upward movement of the tool 100 with respect to the pipe 80 (shown in FIG. 1). As shown, the spring bar 220 can engage with the bore 248 of the pipe coupon 240 where the width 778 (shown in FIG. 7) of particular serrations 770 of the spring bar 220 measure less than or equal to a chord length 1310 of the bore 248 at a position of engagement of the spring bar 220 with the pipe coupon 240.

As shown in FIG. 14, insertion of the tool 100 into the bore 248 of the pipe coupon 240 far enough to cause deformation of the spring bar 220 from an unsprung or undeformed position or state 1410 to a deformed position or state 1420 can help ensure ongoing engagement of the serrations 770 with the bore 248. Further deformation of the spring bar 220 to a third release state (not shown) by, for example and without limitation, pushing of the tab 790 or another portion of the spring bar 220 can facilitate removal of the tool 100 from the pipe coupon 240. Any of the aforementioned surfaces of the spring bar 220 can be angled with respect to the central axis 101 when the tool 100 is engaged with the pipe coupon 240 or when the spring bar 220 is in any of the undeformed state 1410, the deformed state 1420, and the release state. In some aspects, as shown, a single instance of the spring bar 220 can be secured to the rod 410 to form the tool head 210. In some aspects, two or more instances of the spring bar 220 can be secured to the rod 410—for example and without limitation, on opposing sides of the rod 410—to form the tool head 210.

FIGS. 15 and 16 are sectional views of an assembly of the tool head 210 of FIGS. 8-12 with the pipe coupon 240. FIG. 15 shows the tool head 210 of FIGS. 8-12 during installation of the tool head 210 in the pipe coupon 240 in an insertion direction 1510, while FIG. 16 shows the same tool head 210 after installation in the pipe coupon 240. As shown, the spring bars 220a,b can fold up against the first narrow portion 810 and both the spring bars 220a,b and at least a portion of the first narrow portion 810 of the rod 410 can extend through the bore 248 and into the pipe coupon 240.

As shown in FIG. 16, after insertion and passage of the spring bars 220a,b through the bore 248, the spring bars 220a,b can either by the force of gravity or by action of the biasing element 850 expand or open inside the pipe coupon 240, the operation of the spring bars 220a,b being similar in aspects to operation of the wings of a fastener used to secure on object to an interior wall of a building formed with drywall. In contrast to what is sometimes called a toggle bolt anchor, however, the rod 410 does not need to be threaded through a nut and instead the spring bars 220a,b can be pinned in a single position on the rod 410 to form the tool head 210. Additionally, the toggle bolt is configured for installation only and generally cannot be loosened without somehow pulling on a head of a bolt of the toggle bolt anchor in a direction away from the aforementioned nut, and the wings of the toggle bolt anchor are not configured to be removed from any hole through with the toggle bolt anchor may be installed in. In some aspects, as shown, multiple instances of the spring bars 220a,b can be secured to the rod 410 to form the tool head 210. In some aspects, only a single instance of the spring bar 220a,b can be secured to the rod 410—for example and without limitation, on just a single side of the rod 410—to form the tool head 210.

In some aspects, various components of the pipe coupon extraction tool 100 can be formed from or comprise a metal such as, for example and without limitation, steel. In some aspects, the various components can be formed from any other material, any of which can optionally be corrosion-resistant or replaceable for serviceability. The various components of the pipe coupon extraction tool 100 can be formed from any one or more of a variety of manufacturing processes. For example and without limitation, the spring bar 220 or the spring bars 220a,b, the rod 410, and other components can be fabricated using subtractive manufacturing processes such as machining, forging, stamping; additive manufacturing processes such as three dimensional printing; and any other forming and assembly processes such as bending and riveting.

A method of extracting the pipe coupon 240 from the pipe 80 can comprise inserting the tool head 210 of the pipe coupon extraction tool 100 into the bore 248 cut into the pipe coupon 240 in the insertion direction 1510. The method can comprise inserting at least a portion of each of the rod 410 and the spring bar 220 or the spring bar 220a,b of the tool head 210 into the bore 248 of the pipe coupon 240. The method can comprise pulling the rod 410 and the spring bar 220 or the spring bar 220a,b in a removal direction 1610, which can be opposite from the insertion direction 1510. The method can comprise engaging a portion of the spring bar 220 or the spring bar 220a,b with the inner surface 81 of the pipe 80, in which case the spring bar 220 or the spring bar 220a,b can be configured to stop against and not pass through the bore 248 of the pipe coupon 240 in an engaged position. The method can comprise pulling the pipe coupon 240 away from the pipe 80 with the tool head 210.

The method step of engaging a portion of the spring bar 220 with the inner surface 81 of the pipe 80 can comprise contacting an engagement surface of at least one serration 770 of the spring bar 220 with the inner surface 81 of the pipe 80. The method can comprise the spring bar 220 rotating alternately between an undeformed state and a deformed state of the spring bar 220 or between lesser and greater degrees of the deformed state of the spring bar 220 as the serrations 770 pass through the bore 248. The method can comprise the spring bar 220 making an audible click sound or the user feeling the spring bar 220 click into engagement with the bore 248 of the pipe coupon 240 where the width 778 (shown in FIG. 7) of the spring bar 220 measures less than or equal to the chord length 1310 (shown in FIG. 13) of the bore 248 at a position of engagement of the spring bar 220 with the pipe coupon 240. Such clicks, whether audible or vibrational or both, can provide feedback to the user that the tool 100 has engaged with the pipe coupon 240. Such engagement can in some aspects be confirmed through visual inspection of an interface between the tool 100 and the pipe coupon 240 through the windows 75 (shown in FIG. 1) of the inspection plate 70. The method step of engaging a portion of either of the spring bars 220a,b with the inner surface 81 of the pipe can comprise engaging a portion of either of the spring bar 220a,b with the inner surface 81 of the pipe coupon 240 can comprise contacting the flanges 1010a,b of the respective spring bar 220a,b with the inner surface 81 of the pipe coupon 240. The method step of engaging a portion of the spring bar 220 or the spring bar 220a,b with the inner surface 81 of the pipe coupon 240 can comprise further comprising manipulating a position of the tool head 210 with the tool extension 150 secured to the mounting end 415 of the tool head 210, optionally with the handle portion 252.

The method can comprise lifting the pipe coupon 240 from the pipe 80. The method can more specifically comprise lifting the pipe coupon 240 past the valve 64. The method can comprise closing the valve 64. The method can then comprise draining the valve 64. The method can comprise gaining access to the tool 100 and the pipe coupon 240 by disassembly and/or removal of a portion of the insertion valve assembly 60 and releasing the spring bar 220 or the spring bars 220a,b from engagement with the pipe coupon 240.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A pipe coupon extraction tool comprising:
   a tool head comprising:
      a rod defining a first end, a second end, and a central axis; and
      a spring bar defining a first end and a second end, the spring bar rotatably secured to the rod, a surface of the spring bar angled with respect to the central axis when the pipe coupon extraction tool is engaged with a pipe coupon, the spring bar being configured not to flex between the first end and the second end; and
   a tool extension secured to the first end of the rod of the tool, the tool extension defining a tool end and a handle end, the tool extension comprising a handle portion proximate to the handle end, the handle portion configured to be grasped by a hand of a user of the pipe coupon extraction tool, the tool extension further comprising a valve configured to selectively place an interior cavity of the tool head in fluid communication with an inlet defined in the handle end of the tool extension.

2. The tool of claim 1, wherein the spring bar is rigid, and wherein the spring bar is configured not to flex between the first end and the second end.

3. The tool of claim 1, wherein the spring bar comprises at least one flange configured to prevent flexing of the spring bar.

4. The tool of claim 1, wherein the spring bar defines a taper from the first end towards the second end.

5. The tool of claim 1, wherein a radius formed by the spring bar when the pipe coupon extraction tool is engaged with the pipe coupon and defined with respect to a radial direction of the tool is configured to be greater than a bore of the pipe coupon with which the tool is configured to be engaged.

6. The tool of claim 1, wherein the spring bar is a first spring bar, the tool further comprising a second spring bar and a fastener, the second spring bar rotatably secured to the rod at a position proximate to the second end of the rod and opposite from the first spring bar, the fastener connecting both the first spring bar and the second spring bar to the rod.

7. The tool of claim 1, further comprising a fastener securing the spring bar to the rod.

8. The tool of claim 7, wherein the fastener is angled with respect to the central axis of the rod.

9. The tool of claim 8, wherein the fastener is angled at 90 degrees with respect to the central axis of the rod.

10. The tool of claim 1, further comprising a biasing element in contact with the spring bar, the biasing element configured to maintain an open position of the spring bar.

11. The tool of claim 10, wherein the biasing element is a torsion spring, a first end of the torsion spring contacting an inside surface of the spring bar.

12. The tool of claim 1, wherein the tool head is removably secured to the tool extension with a fastener.

13. The tool of claim 1, wherein the handle of the tool extension comprises a first portion and a second portion, each of the first portion and the second portion extending in opposite directions away from a central shaft of the tool extension.

14. The tool of claim 13, wherein the first portion and the second portion extend away from the central shaft of the tool extension relative to an axis of the tool extension.

15. The tool of claim 1, wherein the tool extension is secured to the first end of the rod of the tool head with a fastener extending through the tool extension and the rod, the fastener comprising a pin.

16. The tool of claim 1, wherein the first end of the rod defines a connection bore defining an axis angled with respect to the central axis, the tool extension secured to the first end of the rod of the tool head with a fastener extending through the tool extension and the connection bore of the rod.

17. A method of extracting a pipe coupon from a pipe, the method comprising:
   inserting a tool head of a pipe coupon extraction tool into a bore cut into the pipe coupon, the tool head comprising a rod defining a first end and a second end;
   inserting at least a portion of each of the rod and a spring bar of the tool head into the bore of the pipe coupon without the spring bar itself flexing;
   engaging a portion of the spring bar with an inner surface of the pipe coupon, the spring bar configured to stop against and not pass through the bore of the pipe coupon in an engaged position;
   manipulating a position of the tool head with a tool extension secured to the tool head, the tool extension defining a tool end and a handle end, the tool extension further comprising a valve configured to selectively place an interior cavity of the tool head in fluid communication with an inlet defined in the handle end of the tool extension; and
   pulling the pipe coupon away from the pipe with the tool head.

18. The method of claim 17, wherein engaging a portion of the spring bar with the inner surface of the pipe coupon comprises contacting a flange of the spring bar with the inner surface of the pipe coupon.

19. The method of claim 17, wherein the tool head further comprises a biasing element configured to push a portion of the spring bar away from the rod towards an open or engaged position, inserting at least a portion of each of the rod and the spring bar of the tool head into the bore comprising loading the biasing element by pushing the spring bar towards a closed position in which the spring bar is in close proximity to the rod and against a force exerted by the biasing element.

20. The method of claim 17, wherein the tool head comprises the rod defining the first end, the second end, and a central axis, the first end defining a connection bore defining an axis angled with respect to the central axis, the tool extension secured to the first end of the rod of the tool head with a fastener extending through the tool extension and the connection bore of the rod.

* * * * *